UNITED STATES PATENT OFFICE.

ARTHUR WEINBERG, OF FRANKFORT-ON-THE-MAIN, PRUSSIA, GERMANY, ASSIGNOR TO LEOPOLD CASSELLA & CO., OF SAME PLACE.

BLUE COLORING-MATTER FROM NITROSO DERIVATIVES UPON PHENYLENE-DIAMINES.

SPECIFICATION forming part of Letters Patent No. 395,300, dated December 25, 1888.

Application filed May 10, 1888. Serial No. 273,493. (No specimens.)

*To all whom it may concern:*

Be it known that I, ARTHUR WEINBERG, doctor of philosophy, residing at Frankfort-on-the-Main, in the Kingdom of Prussia, Germany, have invented new and useful Improvements in the Production of a New Class of Blue Coloring-Matters, of which the following is a specification.

This invention relates to the manufacture of new blue coloring-matters, which are formed by the action of the paranitroso derivatives of secondary and tertiary amines (such as dimethylaniline, diethylaniline, monomethylaniline, monoethylaniline, dimethylorthotoluidine, &c.) on the diphenylmetaphenylendiamine $C_6H_4(NHC_6H_5)_2$ and its homologues.

Example: In order to carry out my invention I may proceed as follows: Twenty-five kilograms of diphenylmetaphenylendiamine (or the corresponding quantity of ditolylmetaphenylendiamine or dixylylmetaphenylendiamine) I heat in alcoholic solution with fifty kilograms of hydrochlorate of nitroso-dimethylaniline. As soon as the reaction is finished the smelt is diluted with water, filtered, and the coloring-matter is precipitated by means of common salt. If less of the nitroso compound—for instance, only twenty-five kilograms—are used, the shade of the coloring-matter becomes somewhat more violet.

Instead of alcohol, other solvents may be used.

The coloring-matter represents a powder of bronze-like appearance. It dissolves in strong sulphuric acid with a black shade. It dyes wool, silk, and mordanted cotton in dark-blue shades which resist washing.

What I claim as new, and desire to secure by Letters Patent, is—

As articles of manufacture, a new class of blue coloring-matters produced by the action of paranitroso derivatives of secondary and tertiary amines upon diphenylmetaphenylendiamine, ditolylmetaphenylendiamine, or dixylylmetaphenylendiamine.

In testimony whereof I have signed my name to this specification in the presence of two subscribing witnesses.

ARTHUR WEINBERG.

Witnesses:
ALVESTO S. HOGUE,
JEAN GRUND.